(12) United States Patent
Julien et al.

(10) Patent No.: US 8,781,267 B2
(45) Date of Patent: Jul. 15, 2014

(54) OPTICAL PHYSICAL INTERFACE MODULE

(75) Inventors: Martin Julien, Laval (CA); Robert Brunner, Montreal (CA)

(73) Assignee: Telefonaktiebolaget L M Ericsson, Stockholm (SE)

( * ) Notice: Subject to any disclaimer, the term of this patent is extended or adjusted under 35 U.S.C. 154(b) by 156 days.

(21) Appl. No.: 13/360,236

(22) Filed: Jan. 27, 2012

(65) Prior Publication Data

US 2013/0195396 A1    Aug. 1, 2013

(51) Int. Cl.
G02B 6/36 (2006.01)
(52) U.S. Cl.
USPC ............................................... 385/14
(58) Field of Classification Search
CPC ............ H05K 1/0274; G02B 6/36; G02B 6/38
USPC ..................................... 385/14, 56
See application file for complete search history.

(56) References Cited

U.S. PATENT DOCUMENTS

| | | | | |
|---|---|---|---|---|
| 5,091,991 A * | 2/1992 | Briggs et al. | ...................... | 385/82 |
| 5,325,455 A * | 6/1994 | Henson et al. | ................... | 385/89 |
| 5,515,195 A | 5/1996 | McAdams | | |
| 6,860,028 B2 * | 3/2005 | Charest et al. | ................... | 33/645 |
| 7,044,656 B1 | 5/2006 | Hofmeister | | |
| 7,300,214 B2 | 11/2007 | Doo | | |
| 7,333,682 B2 * | 2/2008 | Kobayashi et al. | ............. | 385/14 |
| 7,574,143 B2 | 8/2009 | Von Lerber | | |
| 7,657,136 B2 * | 2/2010 | Matsuoka et al. | .............. | 385/14 |
| 2001/0030789 A1 | 10/2001 | Jiang et al. | | |
| 2008/0232737 A1 * | 9/2008 | Ishigami et al. | ................ | 385/14 |

FOREIGN PATENT DOCUMENTS

EP    1760895 A1    3/2007

OTHER PUBLICATIONS

Kobashi K., Recent progress on opto-electronics technology for future multi-media world, Opto-Electronics Research Laboratories, NEC Corporation, Kawasaki, Japan, Jun. 9, 1993, pp. 389-392.
PCT/IB2013/050586—International Search Report, European Patent Office, FILIP, Hannelore, Rijswijk, The Netherlands, Jun. 11, 2013.

* cited by examiner

*Primary Examiner* — Charlie Peng
(74) *Attorney, Agent, or Firm* — Ericsson Canada Inc.

(57) ABSTRACT

An optical physical interface module is provided which includes a first optical physical interface, a second optical physical interface and one or more optical components. The first optical physical interface is configured to plug into a first connector and communicate optical signals toward the first connector. The second optical physical interface is configured to receive a second connector and communicate optical signals toward the second connector. The one or more optical components are operable to process optical signals between the first and second optical physical interfaces. The optical physical interface module may be provided at the edge of a circuit board so that the circuit board has an optical interface for external communication. The optical physical interface module may be a stand-alone module or integrated into a connector of an optical cable, among other configurations.

7 Claims, 5 Drawing Sheets

OPTICAL PHYSICAL INTERFACE MODULE

TECHNICAL FIELD

The present invention generally relates to optical communications, and more particularly relates to providing optical signals up to and including the edge of a circuit board.

BACKGROUND

Physical interface modules, such as the 'enhanced Small Form-factor Pluggable' module (SFP+), the 'Quad Small Form-factor Pluggable' module (QSFP) and the '120 Gb/s 12x Small Form-factor Pluggable' module (CXP) are compact, hot-pluggable transceivers used for both telecommunication and data communications applications. Physical interface modules are typically used to interface a network device to a fiber optic or copper networking cable.

Some physical interface modules such as the SFP+ are hot-swappable electronic components that have an electrical interface toward the electronic device being interfaced with the network, and a specific copper or optical interface toward the network. SFP+ modules are widely used because of their hot-swappable characteristic, which means that they are replaceable at run-time without having to shut down the system. While preserving the same electrical interface with the electronic devices, several different copper or optical interfaces are typically used toward the network. Such flexibility has resulted in widespread adoption of hot-pluggable SFP+ modules by network operators.

There are different variants of physical interface modules, mainly depending on required bandwidth, speed, power and distance of the interconnection. While there are several variants of physical interface modules, each variant typically has the characteristic of being pluggable at the edge of electronic cards, boards or boxes. Once the physical interface module is inserted at the edge of the device, a networking cable can be connected to the physical interface module.

Active optical cables (AOC) are similar in concept to physical interface modules, and are typically located at the edge of an electronic card, board or box. An AOC reuses the same electrical interface as an already existing physical interface module, such as a QSFP module, as well as the same cage located on the electronic equipment, normally meant for a physical interface module. One of the main differences between a physical interface module, such as a QSFP module, and an AOC-based QSFP is that the AOC does not provide a standardized networking interface, only a standardized electrical interface toward the electronic device. For example, in the case where the AOC vendor provides an optical signal at a specific non-standardized wavelength, then only that vendor can interconnect with its own equipment.

Both ends of an AOC cable are terminated with a physical interface module. Both modules are inseparable from the cable. An optical engine is included in each connector of the AOC. Each optical engine converts signals between the electrical and optical domains.

By using standardized physical interface modules and AOCs, it is possible to develop electronic equipment, such as servers, switches and routers, with the option of leaving to the network operators the task of carefully selecting the required network interface at deployment time. While this approach has several advantages, there are a few optimizations that can be considered in order to better address the increasingly important challenges concerning footprint and energy consumption.

For example, a large part of the energy consumed by a physical interface module located on the edge of a board, such as a CXP module or an AOC, is used for interfacing the electronic components directly located on the same board. That means that modules located on the edge of cards or boards could greatly reduce their power consumption if the length of electrical traces between electronic components on the board, such as an ASIC (Application Specific Integrated Circuit), and a physical interface module located on the edge is significantly shortened.

Also, physical interface modules are typically designed for flexibility and interoperability which normally results in a corresponding form-factor which is not necessarily optimized in terms of size. For example, the same QSFP physical interface module can be used for short-reach and long-reach applications. While the long-reach variant requires significantly more power than the short-reach variant, the form-factor specification for the QSFP module is typically based on the required power consumption of the long-reach variant. Accordingly the size of a physical interface module is typically much larger than what is minimally required.

More recently, optical engines have received wider use for interfacing electronic equipment. Optical engines are components used to convert electrical signals into optical signals, and vice-versa. Optical engines are typically required to be placed at a very close proximity to the source of the electrical signals to be converted into optical signals. While such close proximity minimizes the length of electrical traces, the complexity of electronic components typically required in CXP modules and AOCs can be greatly reduced by using optical engines, for example by eliminating the need for Clock Data Recovery (CDR) functions. Such reduced complexity brings smaller footprint and power savings.

Optical engines can be extremely small, and in comparison with an equivalent standardized physical interface module, optical engines can be smaller by an order of magnitude. While there are several different variants of optical engines, and there is currently no standardized form-factor and agreement for building them, optical engines are aimed at providing extremely efficient and optimized solutions in terms of energy consumption and footprint. However, currently there are no standards on the form-factor for optical engines. As such, optical engines from different vendors are not likely to be compatible.

Another conventional component found in optical-based networks is an optical fiber connector which terminates the end of an optical fiber. A connector mechanically couples and aligns the cores of fibers so that light can pass. Optical fiber connectors are used to join optical fibers when a connect/disconnect capability is required. In telecommunication and data communication applications, small connectors (e.g., so-called LC connectors) and multi-fiber connectors (e.g., so-called MTP connectors) are replacing more traditional connectors (e.g., so-called SC connectors), mainly to provide a higher number of fibers per unit of rack space.

A so-called MT connector, e.g. an MTP or MPO connector, can be used to interconnect up to 72 optical waveguides. The alignment of the optical fibers is possible because of the alignment pins available on the MT connector. In the case where multiple MT connectors are required, an array connector can be used to hold several MT connectors. Each MT connector has its own alignment pins, and additional alignment pins are provided for the array connector itself.

Current physical interface modules and AOCs are used to convert electrical to/from optical, not optical to/from optical. The use of optical engines instead of standardized physical interface modules can significantly reduce the footprint and power consumption of electronic circuit boards. Networking systems are increasingly required to become smaller and consume less energy, and therefore solutions based on optical engines are increasingly important in electronic board designs. Accordingly communications between electronic components located on the same board, or on different boards, must be done through the optical domain. However optical engines do not provide the flexibility and interoperability offered by standardized physical interface modules, nor a standardized form-factor. With the development of optical engines, optical signals will be driven directly from the PCB, and eventually directly from the ASIC devices. It will no longer be possible to selectively decide on the optical interface to use for interconnection, and a corresponding physical interface module for such optical engine based implementations is therefore desirable.

SUMMARY

A true optical physical interface module is provided, where both interfaces of the module use optical signals for carrying data traffic. That is, both ends of the physical interface module have an optical interface e.g. toward a circuit board and also toward the network. The optical physical interface module can be used to amplify optical signal strength in order to reach longer distances, provide wavelength conversion, filtering, etc. Conversion between optical and electrical signals between the optical interfaces of the module can be provided, so that electrical signal processing may be performed. In each case however, the signals entering and exiting the optical physical interface module are optical and not electrical.

The optical physical interface module can be located directly on a circuit board such as a PCB, or inside an adapter or a connector on the internal or external edge of a circuit board. The optical physical interface module can be completely passive (i.e. unpowered), or active. Also, an optimized form-factor may be specified. To support the optical physical interface module, an optical interface toward the components on the circuit board is provided. In addition to the optical data interface, optional control and power interfaces may be required. For example, the alignment pins conventionally provided for aligning the optical waveguides of an MT adapter with the corresponding ones of an MT connector can also be used to provide control signals and power to the optical physical interface module, if required. The alignment pins of such a connector can be used to provide electricity and ground to the optical physical interface module which may need power for its specific electrical or optical functions. Optionally, additional dedicated pins for control and power can also be used.

In general, an optical physical interface module is provided which includes a first optical physical interface, a second optical physical interface and one or more optical components. The first optical physical interface is configured to plug into a first connector and communicate optical signals toward the first connector. The second optical physical interface is configured to receive a second connector and communicate optical signals toward the second connector. The one or more optical components are operable to process optical signals between the first and second optical physical interfaces. The optical physical interface module may be provided at the edge of a circuit board so that the circuit board has an optical interface for external communication. The optical physical interface module may be a stand-alone module or integrated into the connectors of an optical cable, among other configurations.

According to an embodiment including the optical physical interface module connected at an edge of a circuit board, an integrated circuit is connected to the circuit board and operable to process electrical signals and an optical engine is connected to the circuit board and operable to convert between electrical signals toward the integrated circuit and optical signals. The first optical interface of the optical physical interface module is operable to communicate optical signals with the optical engine and the second optical interface of the optical physical interface module is operable to receive an optical connector and communicate optical signals with the optical connector so that the edge of the circuit board has an optical interface for external communication.

According to an embodiment including one of the optical physical interface modules disposed at each end of an optical cable, the cable also has a plurality of optical waveguides, a first cable connector at a first end of the plurality of optical waveguides and a second cable connector at an opposing second end of the plurality of optical waveguides. The first optical physical interface of the first optical physical interface module is configured to plug into a first external connector and communicate optical signals toward the first external connector, and the second optical physical interface of the optical physical interface module is connected to the first cable connector and operable to communicate optical signals toward the plurality of optical waveguides via the first cable connector. The first optical physical interface of the second optical physical interface module is configured to plug into a second external connector different than the first external connector and communicate optical signals toward the second external connector, and the second optical physical interface of the second optical physical interface module is connected to the second cable connector and operable to communicate optical signals toward the plurality of optical waveguides via the second cable connector.

Those skilled in the art will recognize additional features and advantages upon reading the following detailed description, and upon viewing the accompanying drawings.

BRIEF DESCRIPTION OF THE DRAWINGS

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

Figure 1:
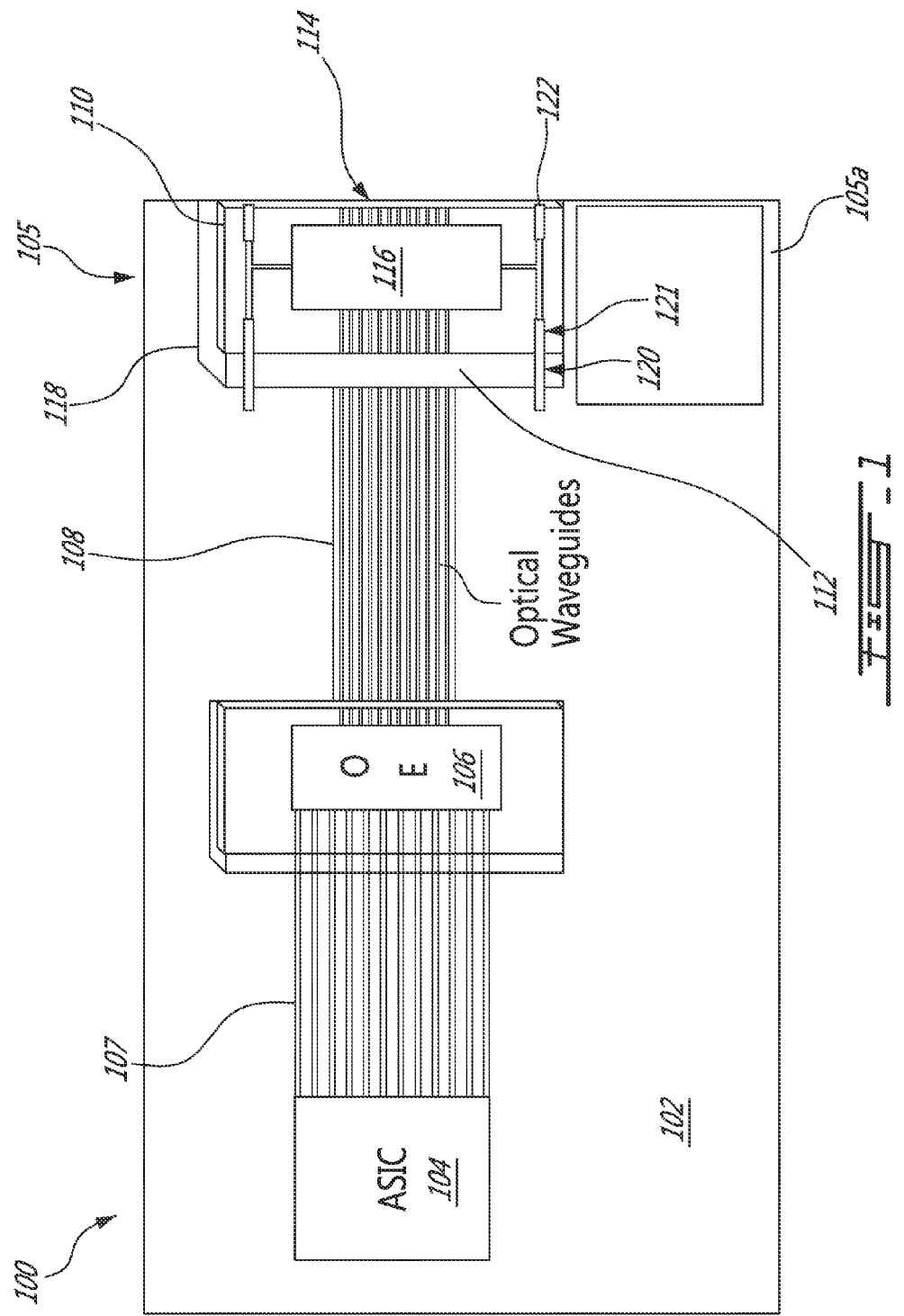
FIG. 1 is a diagram of one embodiment of a network communication device including an optical physical interface module at the edge of the device.

As a non-limiting example, FIG. 1 illustrates a partial view of a network communication device 100 which includes a circuit board 102 such as a PCB and a plurality of integrated circuits connected to the circuit board 102 for processing electrical signals. For example, an ASIC 104 is shown on the circuit board 102 in the partial view of the FIG. 1. Additional or other integrated circuits may be connected to the circuit board 102 for processing electrical signals. An optical engine (OE) 106 is also connected to the circuit board 102 and converts between electrical signals toward the ASIC 104 or other integrated circuit and optical signals toward the edge 105 of the circuit board 102.

The optical engine 106 can be located very close e.g. below 5 cm to the source of the electrical signals being converted into optical signals (e.g. the ASIC 104 in FIG. 1), resulting in a significant power reduction. Electrical traces 107 connect the ASIC 104 to the optical engine 106. Alternatively, the optical engine 106 and the source of the electrical signals being converted into optical signals may be integrated on the same die. In each case, optical fibers 108 or other type of optical waveguides couple the optical engine 106 to an optical physical interface module 110 which is connected at the edge 105 of the circuit board 102. The optical physical interface module 110 has a first optical interface 112 operable for communicating optical signals with the optical engine 106 via the optical waveguide 108, and a second optical interface 114 operable for receiving an optical connector (not shown in FIG. 1) and communicating optical signals toward the network. The edge 105 of the circuit board 102 therefore has an optical interface provided by the optical physical interface module 110, instead of an electrical interface as required by conventional physical interface modules and AOCs.

The optical physical interface module 110 does not provide an electrical interface for carrying data traffic, but rather only optical interfaces. Mainly optical-based functions are implemented in the optical physical interface module 110. To this end, the optical physical interface module 110 includes one or more components 116 such as an optical transposer and processor (OTP) for processing optical signals between the first and second optical physical interfaces 112, 114. For example, the component(s) 116 of the module 110 may amplify the optical signal strength in order to reach longer distances, provide wavelength conversion, filtering, etc. One or more of the components 116 may be electrical or electro-optical components for converting between optical and electrical signals between the first and second optical interfaces 112, 114. In each case, the data traffic is presented as optical signals at both interfaces 112, 114 of the module 110.

The optical physical interface module 110 can be located directly on the circuit board 102, or integrated or plugged into an adapter or connector 118 such as an MT connector or adapter on the internal edge 105a of the circuit board 102 as shown in FIG. 1. In one embodiment, the connector 118 has pins 120 which are received in corresponding openings 121 of the first optical interface 112 of the module 110. Alternatively the alignment pins can be located on the module 110 instead of the connector 118. The pins 120 provide for aligned insertion between the module 110 and the connector 118 on the board 102. The optical physical interface module 110 can be completely passive (i.e. unpowered), or active. In the case of an active module, one or more of the connector pins 120 can be conductive and provide power, ground and/or control signals to the optical physical interface module 110 via the openings 121 of the first optical physical interface 112. Alternatively, the first optical interface 112 of the module 110 may have pins 120 for insertion in corresponding openings in the connector 118 on the circuit board 102. Either way, power and/or control signals can be provided to the optical physical interface module 110 via such alignment pins, or via separate dedicated pins.

The optical physical interface module 110 can be pluggable and hot-swappable so that the optical physical interface module 110 can be connected at the edge 105 of the circuit board 102 without shutting down the device 100. The optical physical interface module 110 allows optical signals used on the circuit board 102 to be processed according to specific interconnect requirements with other circuit boards or systems. In one embodiment, the optical physical interface module 110 communicates optical signals with the optical engine 106 in accordance with a first optical signal protocol and communicates optical signals with the optical connector toward the network in accordance with a second optical signal protocol different than the first protocol. This way the optical engine 106 can support a protocol different than the network, and the optical physical interface module 110 includes one or more components 116 for managing the protocol conversion to ensure seamless operation between the device 100 and the network.

Figure 2:
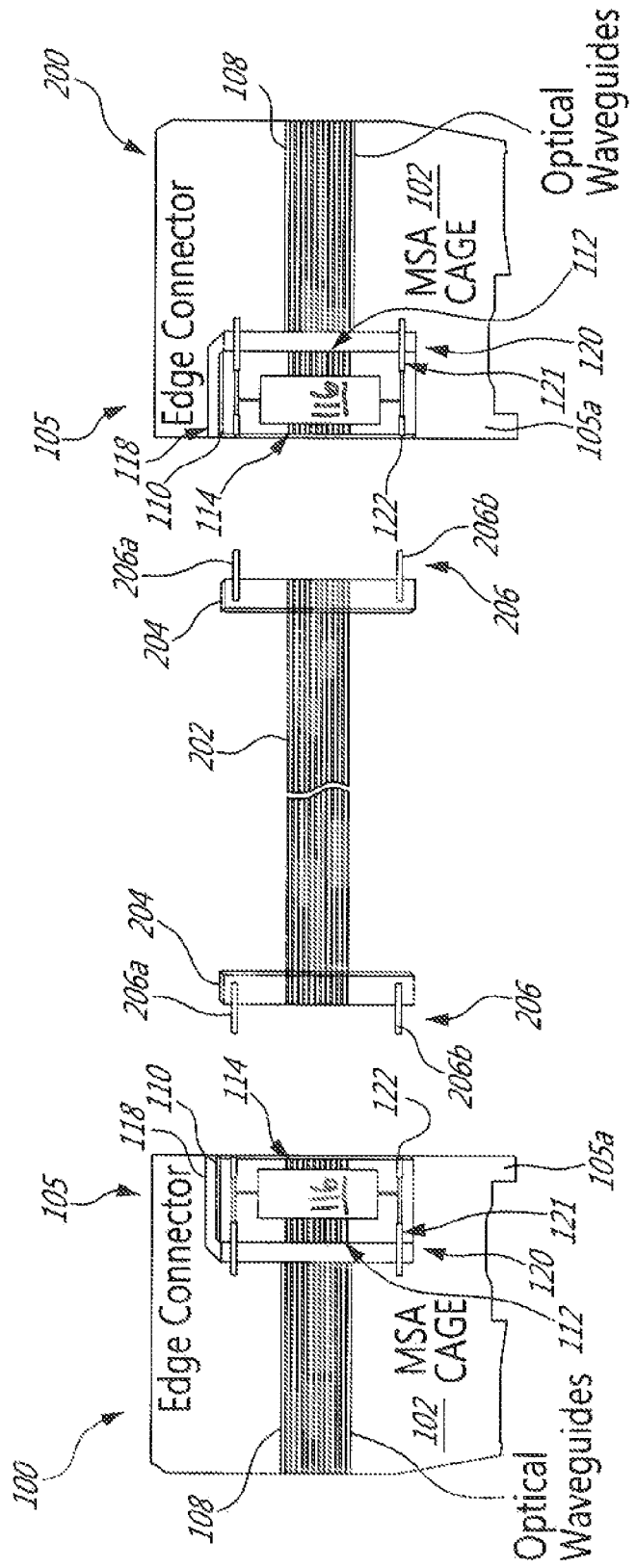
FIG. 2 is a diagram of one embodiment of two devices coupled by an optical fiber and each including an optical physical interface module.

FIG. 2 illustrates an embodiment of an optical network including two devices 100, 200 coupled together via an optical cable 202. Each device 100, 200 includes an optical physical interface module 110 connected to the edge 105 of a circuit board 102 such as a PCB for providing an optical interface at the edge 105 of the board 102. Each optical physical interface module 110 is located on the internal edge 105a of the circuit board 102 according to this embodiment and therefore requires a footprint on the respective boards 102. However the footprint is much less than the footprint for a typical equivalent standardized physical interface module. Each optical physical interface module 110 can be hot-swappable as previously described herein, to allow more flexibility and manageability.

Each end of the optical cable 202 has an optical connector 204 for connecting with one of the optical physical interface modules 110. For example, one optical interface 114 of each optical physical interface module 110 receives pins 206 protruding from the corresponding optical connector 204 of the cable 202. The pins 206 are used to align each optical connector 204 of the cable 202 with one of the optical interfaces 114 of the corresponding module 110 during insertion. Power and/or control signals can be provided to the optical physical interface modules 110 via a pin type connection between the opposing optical interface 112 of the module 110 and the connector disposed on the circuit board 110 as previously described herein.

Figure 3:
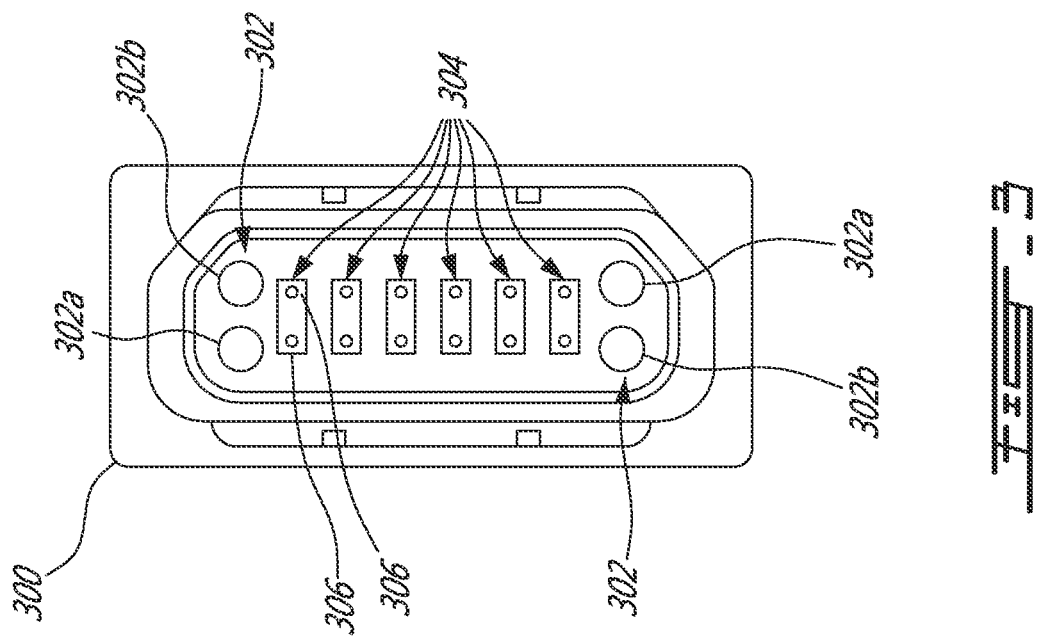
FIG. 3 is a diagram of one embodiment of an array connector with alignment pins which can be used to power and/or provide control signals to an optical physical interface module.

FIG. 3 illustrates a side view of an embodiment of the connector 118 disposed on the circuit board 102. According to this embodiment, the connector 118 is an array connector 300 having general alignment pins 302 and a plurality of arrayed connectors 304 each having its own alignment pins 306. The optical interface 112 of the optical physical interface module 110 configured to receive the array connector 300 is provided power from at least one of the general alignment pins 302 and/or any of the arrayed connector alignment pins 306. For example, the optical interface 112 of the module 110 can receive power from first ones 302a of the general alignment pins 302 and ground from second ones 302b of the general alignment pins 302. The optical physical interface module 110 can also receive control signals from one or more other ones of the pins 302, 306. In one embodiment, the array connector 300 is an array of MT connectors. Alternatively, the optical interface 112 of the optical physical interface module 110 includes the array connector 300 and the connector 118 disposed on the circuit board 102 includes a mating connector.

Figure 4:
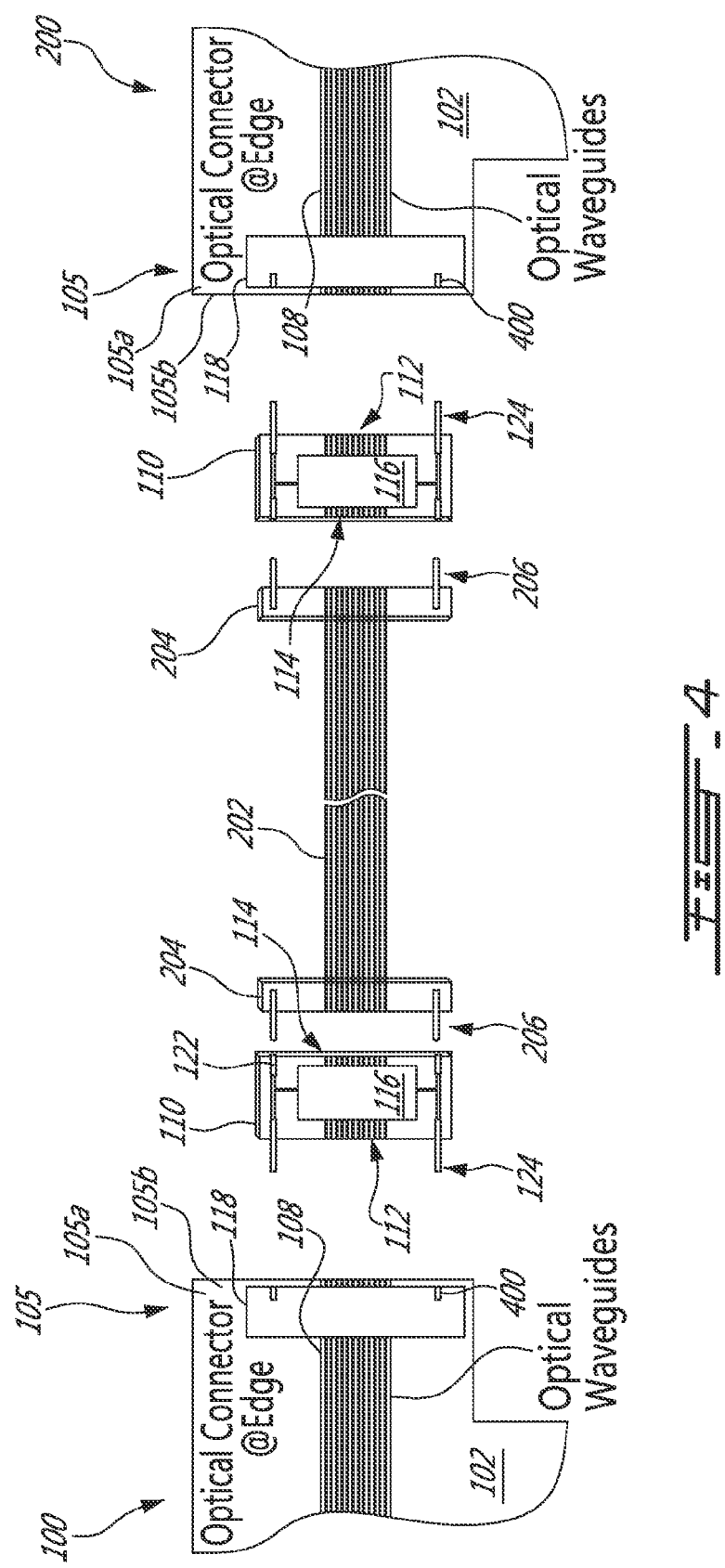
FIG. 4 is a diagram of another embodiment of two devices coupled by an optical fiber and each including an optical physical interface module.

FIG. 4 illustrates an embodiment of an optical network including two devices 100, 200 coupled together via an optical cable 202 which is similar to the illustration of FIG. 2, with each optical physical interface module 110 located on the external edge 105b of the corresponding circuit board 102 after insertion instead of the internal edge 105a as shown in FIG. 2. As such, each optical physical interface module 110 is located on the outward facing side of the board edge adapter /connector 118 as compared to the embodiment shown in FIG. 2.

According to this embodiment, each optical physical interface module 110 is a stand-alone module having a first optical physical interface 112 configured for plugging into the connector 118 disposed at the internal edge 105a of the corresponding circuit board 102 and communicating optical signals toward an optical engine 106 connected to the circuit board 102. Each optical physical interface module 110 also has a second optical physical interface 114 for receiving an optical connector 204 e.g. attached to an optical cable 202, and communicating optical signals toward the optical connector 204 i.e. toward the network. Each optical physical interface module 110 includes one or more components 116 such as an OTP operable for processing optical signals between the optical physical interfaces 112, 114 of the module 110 as previously described herein.

The second optical physical interface 114 of each optical physical interface module 110 can be configured to receive one or more pins 206 protruding from the corresponding optical connector 204. These pins 206 are alignment pins e.g. of an MT connector and are received by corresponding openings 122 in the second optical physical interface 114 for aligning the optical connector 204 with the interface 114 of the corresponding module 110 as previously described herein. Alternatively, the optical connector 204 can be an array connector including one or more alignment pins and a plurality of arrayed connectors each having one or more own alignment pins e.g. as shown in FIG. 3 and previously described herein. In each case, the second optical physical interface 114 of each optical physical interface module 110 is connected to the corresponding connector 204 of the optical cable 202.

If one or more components 116 of either optical physical interface module 110 require power and/or control signals, such signals can be provided to the module 110 by one or more pins 124 protruding from the other optical physical interface 112 of the module 110 i.e. toward the circuit board 102. These module pins 124 are inserted into corresponding openings 400 in the connector/adapter 118 disposed at the internal edge 105a of the circuit board 102 for aligning the first optical physical interface 112 of the module 110 with the connector/adapter 118. The openings 400 of the connector/adapter 118 can be conductive and provide power, ground and/or control signals to the optical physical interface module 110 via the pins 124 of the first optical physical interface 112 as previously described herein.

Figure 5:
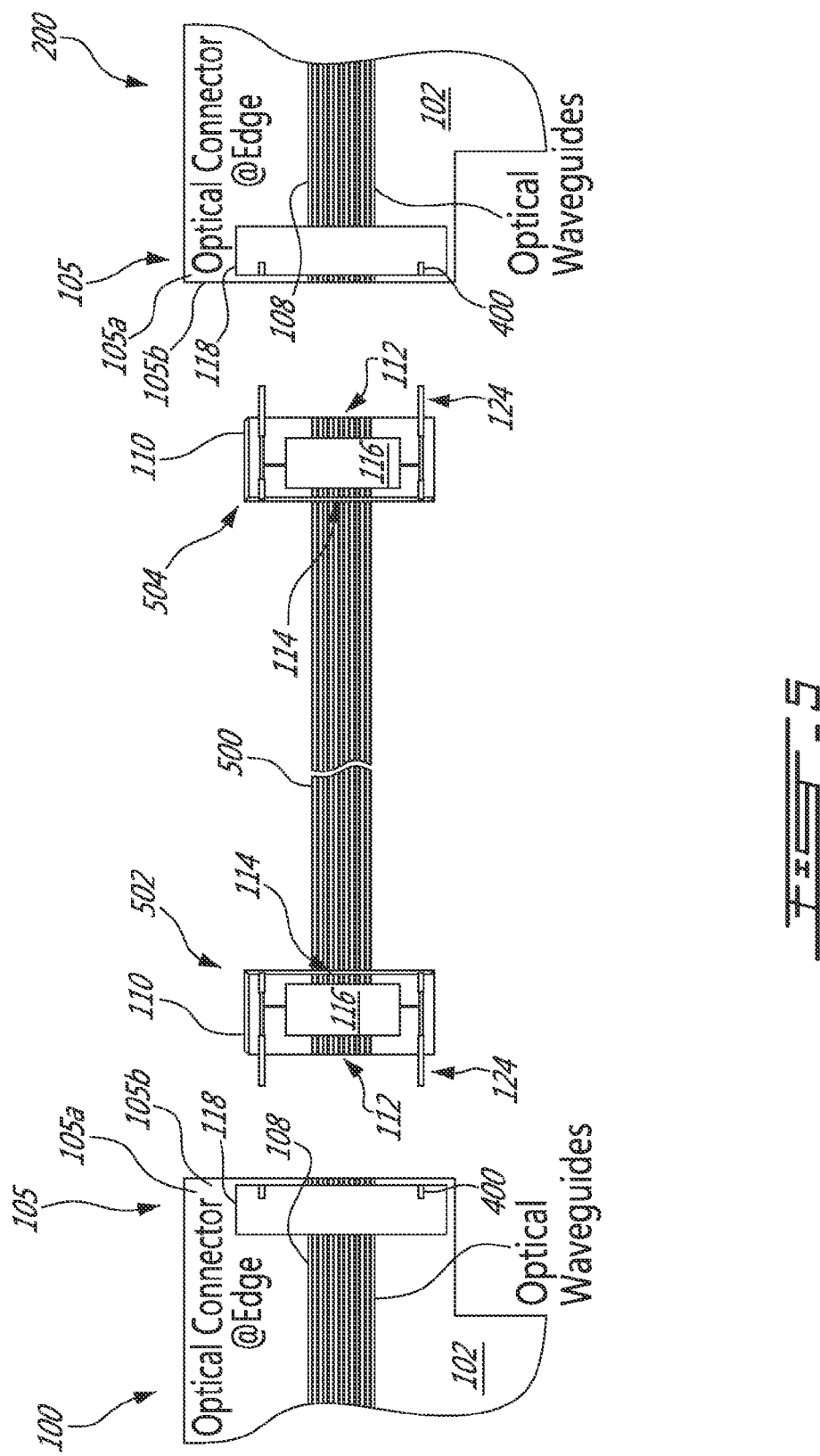
FIG. 5 is a diagram of yet another embodiment of two devices coupled by an optical fiber and each including an optical physical interface module.

FIG. 5 illustrates yet another embodiment where the optical physical interface modules 110 are located at opposing ends of an optical cable 500. The cable 500 is similar to an AOC in this regard, however there are no electrical interfaces for carrying data traffic, only optical signals enter and exit the optical cable 500 via the optical physical interface modules 110.

In more detail, the optical cable 500 has a plurality of optical waveguides, a first cable connector 502 at a first end of the plurality of optical waveguides and a second cable connector 504 at an opposing end of the plurality of optical waveguides. The first optical physical interface module 110 has a first optical physical interface 112 configured to plug into a first external connector 118 e.g. an MT connector disposed at the internal edge 105a of a circuit board 102, and communicate optical signals toward this external connector 118. The first optical physical interface module 110 also has a second optical physical interface 114 connected to the first cable connector 502 for communicating optical signals toward the plurality of optical waveguides of the cable 202 via the first cable connector 502.

The second (opposing) optical physical interface module 110 likewise has a first optical physical interface 112 configured to plug into a second external connector 118 e.g. disposed at the internal edge 105a of another circuit board 102, and communicate optical signals toward the second circuit board 102. The second optical physical interface module 110 also has a second optical physical interface 114 connected to the second cable connector 504 for communicating optical signals toward the plurality of optical waveguides of the cable 500 via the second cable connector 504. The first optical physical interface module 110 can be integrated into the first cable connector 502, and the second optical physical interface module 110 likewise can be integrated into the second cable connector 504.

The first optical physical interface 112 of each optical physical interface module 110 has one or more alignment pins 124 configured for insertion in openings 400 of the corresponding external connector 118. One or more of these openings 400 may be conductive and carry power, ground and/or control signals. Power, ground and/or control signals can be applied to either of the optical modules 110 via the opening(s) 400 of the external connector 118 and the module pin(s) 124, or via other separate dedicated connections.

As described previously herein, the optical physical interface module described herein provides flexibility with regard to optical signals, such as allowing wavelength conversion, signal amplification or signal filtering. In order to perform such functions, active and passive components may be included in the module. The optical physical interface module according to some embodiments can be purely passive, i.e. does not require any external power, while in other embodiments may require additional power for the active component(s) included in the module.

There are several different types of optical interfaces available. However for high density optical interfaces, the most common type of interface is an MT-based connector. Even though such a connector typically supports the interconnection of 12 optical waveguides, it could also support up to 72.

Since a single MT connector is relatively small, adding the optical physical interface module described herein to an MT connector could require a bigger connector in order to allow the desired additional functions. However in reality connectors are typically much bigger than their minimalist representation, in order to account for robustness, shielding, aggregation, etc. As shown in FIG. 3, an array connector can be quite large in order to provide more than a single MT connector and provide robustness with a metal housing. In that metal housing, there is typically enough space to including the functions of the optical physical interface module described herein. Of course, other optical connector types may be used with optical physical interface module.

The data interface to the optical physical interface module is the interface which carries the optical signals. The data interface represents the traffic being exchanged between components of a system. In the context of the optical physical interface module described herein, the data interface is implemented purely in the optical domain on the side toward the circuit and also on the side toward the network.

An optional control interface to the optical physical interface module can be provided if needed e.g. in the case where the module requires some special configuration, monitoring or statistical information. The control interface could be provided by using alignment pins for this dual purpose or dedicated pins as previously described herein. For example, in the case of an array connector as shown in FIG. 3, the alignment pins on arrayed MT connectors can be used for control signals and the alignment pins on the array connector itself can be used for power. While the use of alignment pins for the control interface suggests the use of an electrical interface, optical signals can also be used for the control interface.

A power control interface to the optical physical interface module can be provided in the case where the module requires electrical power. The alignment pins required for aligning the optical waveguides e.g. of an MT adapter with the ones of an MT connector can also be used to provide power to the optical physical interface module, if required. For example, the alignment pins of an MT connector can be used to provide power and ground to the optical physical interface module which may need power for one or more specific electrical and/or optical functions provided by the module. Optionally, additional dedicated pins for power can also be used.

Sharing the alignment pins for providing waveguide alignment and power permits an existing connector such as an MT connector to be physically compatible with a power-enabled variant of the same type of MT connector. The cross-section of the alignment pins is typically large enough to allow several amperes of current for powering electronic components in the optical physical interface module. Optionally, additional dedicated pins for power can also be used.

While power can be provided through the alignment pins of the connector carrying the data signals, such as the alignment pins of an MT connector, power optionally can be provided to the optical physical interface module using the alignment pins of an array connector holding several arrayed MT connectors. As shown in FIG. 3, the array connector contains several arrayed MT connectors. Each arrayed MT connector has its own alignment pins, and the array connector also has its own alignment pins. In such a case, power and/or control signals can be provided to the optical physical interface module through one or both types of alignment pins.

Power can also be provided via a female type of connector, in order to avoid energizing the alignment pins, or dedicated power pins. Typically, optical cables have alignment pins and corresponding adapters on the cards or PCBs provide openings for receiving the alignment pins. In this example, the cards can provide electricity through alignment holes, normally intended for alignment purposes.

The use of optical engines instead of standardized physical interface modules significantly reduces footprint and power consumption of electronic circuit boards. As networking systems are increasingly required to become smaller and consume less energy, solutions based on optical engines become more important in electronic board designs. As such, communications between electronic components located on the same circuit board, or on different boards, will be done through the optical domain. The optical physical interface module described herein provides flexibility and interoperability lacking with optical engines.

Terms such as "first", "second", and the like, are used to describe various elements, regions, sections, etc. and are not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. An apparatus, comprising:
    a circuit board;
    an integrated circuit connected to the circuit board and operable to process electrical signals;
    an optical engine connected to the circuit board and operable to convert between electrical signals toward the integrated circuit and optical signals toward an edge of the circuit board;
    an optical physical interface module connected at the edge of the circuit board, the optical physical interface module comprising a first optical interface operable to communicate optical signals with the optical engine and a second optical interface operable to receive an optical connector and communicate optical signals with the optical connector so that the edge of the circuit board has an optical interface for external communication; and
    a connector attached to the edge of the circuit board, and wherein the optical physical interface module is inserted in the connector,
wherein the first optical interface is configured to receive one or more pins protruding from the connector attached to the edge of the circuit board, and the optical physical interface module is operable to receive at least one of power and control signals via the one or more pins.

2. An apparatus, comprising:
    a circuit board;
    an integrated circuit connected to the circuit board and operable to process electrical signals;
    an optical engine connected to the circuit board and operable to convert between electrical signals toward the integrated circuit and optical signals toward an edge of the circuit board;
    an optical physical interface module connected at the edge of the circuit board, the optical physical interface module comprising a first optical interface operable to communicate optical signals with the optical engine and a second optical interface operable to receive an optical connector and communicate optical signals with the optical connector so that the edge of the circuit board has an optical interface for external communication; and
    a connector attached to the edge of the circuit board, and wherein the optical physical interface module is inserted in the connector,
wherein the first optical interface has one or more pins inserted in corresponding openings of the connector attached to the edge of the circuit board, and the optical physical interface module is operable to receive at least one of power and control signals via the one or more openings.

3. An apparatus, comprising:
a circuit board;
an integrated circuit connected to the circuit board and operable to process electrical signals;
an optical engine connected to the circuit board and operable to convert between electrical signals toward the integrated circuit and optical signals toward an edge of the circuit board;
an optical physical interface module connected at the edge of the circuit board, the optical physical interface module comprising a first optical interface operable to communicate optical signals with the optical engine and a second optical interface operable to receive an optical connector and communicate optical signals with the optical connector so that the edge of the circuit board has an optical interface for external communication; and
a connector attached to the edge of the circuit board, and wherein the optical physical interface module is inserted in the connector,
wherein the connector attached to the edge of the circuit board includes a plurality of arrayed connectors having a plurality of alignment pins, and the first optical interface is configured to receive power from at least one of the alignment pins.

4. An apparatus, comprising:
a circuit board;
an integrated circuit connected to the circuit board and operable to process electrical signals;
an optical engine connected to the circuit board and operable to convert between electrical signals toward the integrated circuit and optical signals toward an edge of the circuit board; and
an optical physical interface module connected at the edge of the circuit board, the optical physical interface module comprising a first optical interface operable to communicate optical signals with the optical engine and a second optical interface operable to receive an optical connector and communicate optical signals with the optical connector so that the edge of the circuit board has an optical interface for external communication;
wherein the first optical interface includes a plurality of arrayed connectors having a plurality of alignment pins, and the first optical interface is configured to receive power from at least one of the alignment pins.

5. An optical physical interface module, comprising:
a first optical physical interface configured to plug into a first connector and communicate optical signals toward the first connector;
a second optical physical interface configured to receive a second connector and communicate optical signals toward the second connector; and
one or more optical components operable to process optical signals between the first and second optical physical interfaces;
wherein the first optical physical interface is configured to receive one or more pins protruding from the first connector and carrying at least one of power and control signals.

6. An optical physical interface module, comprising:
a first optical physical interface configured to plug into a first connector and communicate optical signals toward the first connector;
a second optical physical interface configured to receive a second connector and communicate optical signals toward the second connector; and
one or more optical components operable to process optical signals between the first and second optical physical interfaces;
wherein the first optical interface has one or more pins configured to insert in corresponding openings of the first connector, and the optical physical interface module is operable to receive at least one of power and control signals via the one or more openings.

7. An optical physical interface module, comprising:
a first optical physical interface configured to plug into a first connector and communicate optical signals toward the first connector;
a second optical physical interface configured to receive a second connector and communicate optical signals toward the second connector; and
one or more optical components operable to process optical signals between the first and second optical physical interfaces;
wherein the first connector includes an array connector having one or more alignment pins and a plurality of arrayed connectors each having one or more own alignment pins, and the first optical interface is configured to receive power from at least one of the alignment pins.

* * * * *

UNITED STATES PATENT AND TRADEMARK OFFICE
CERTIFICATE OF CORRECTION

PATENT NO.        : 8,781,267 B2
APPLICATION NO.   : 13/360236
DATED             : July 15, 2014
INVENTOR(S)       : Julien et al.

It is certified that error appears in the above-identified patent and that said Letters Patent is hereby corrected as shown below:

On the Title Page, in item (73), under "Assignee", in Column 1, Lines 1-2, delete "Telefonaktiebolaget L M Ericsson," and insert -- Telefonaktiebolaget L M Ericsson, (Publ) --, therefor.

Signed and Sealed this
Twenty-first Day of October, 2014

Michelle K. Lee
*Deputy Director of the United States Patent and Trademark Office*